Oct. 28, 1958  P. K. BODGE  2,857,761
MASS FLOW METER
Filed Dec. 20, 1954  3 Sheets-Sheet 1
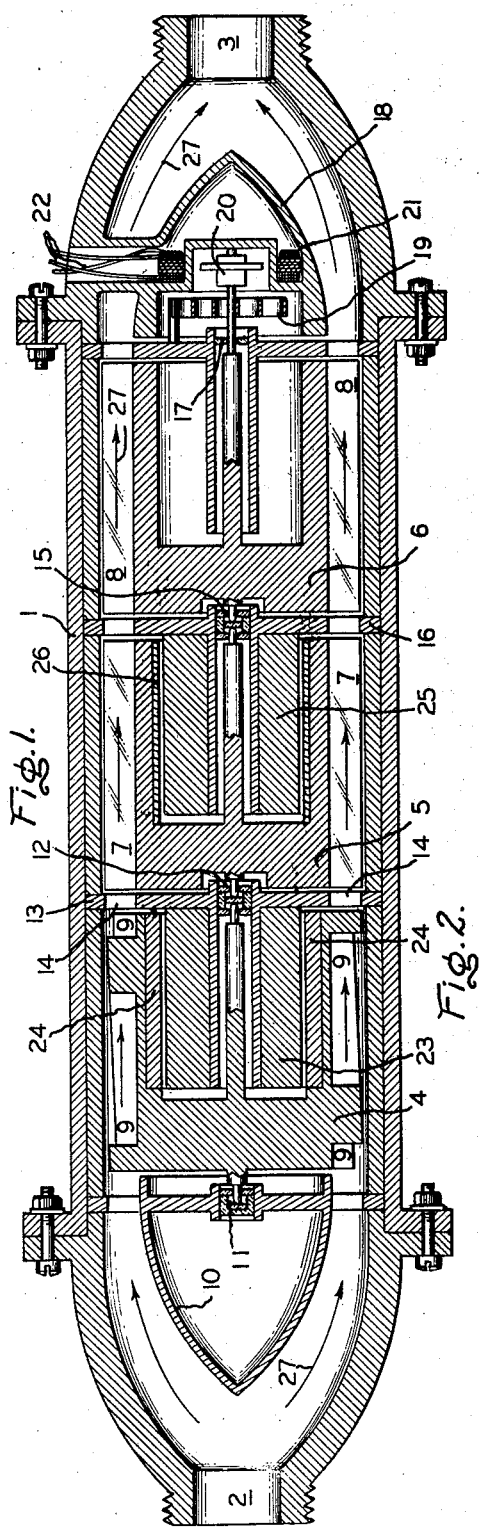
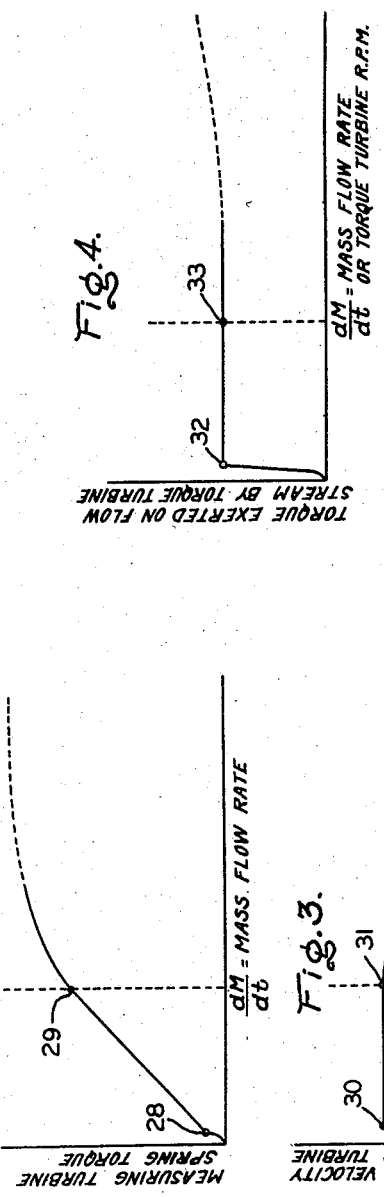
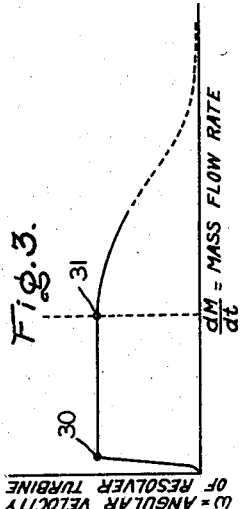
Inventor:
Philip K. Bodge,
by Richard E. Haley
His Attorney.

Oct. 28, 1958 P. K. BODGE 2,857,761
MASS FLOW METER
Filed Dec. 20, 1954 3 Sheets-Sheet 2
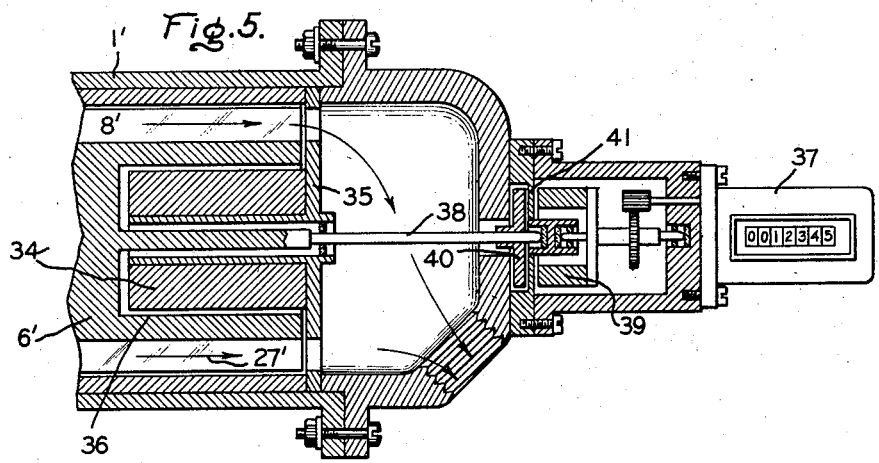
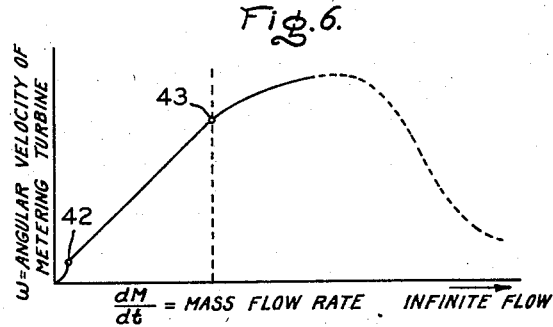
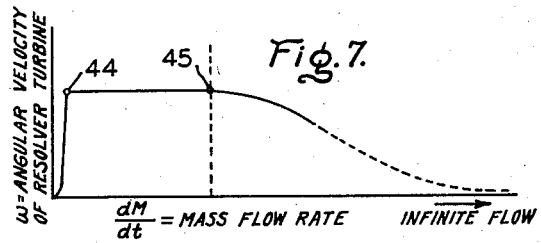
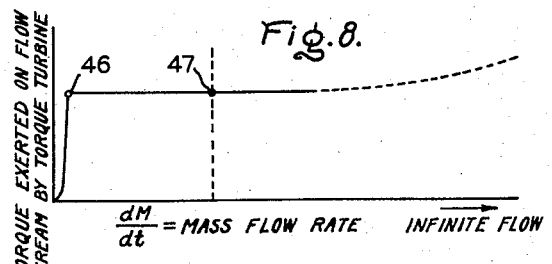
Inventor:
Philip K. Bodge,
by Richard E. Hosley
His Attorney.

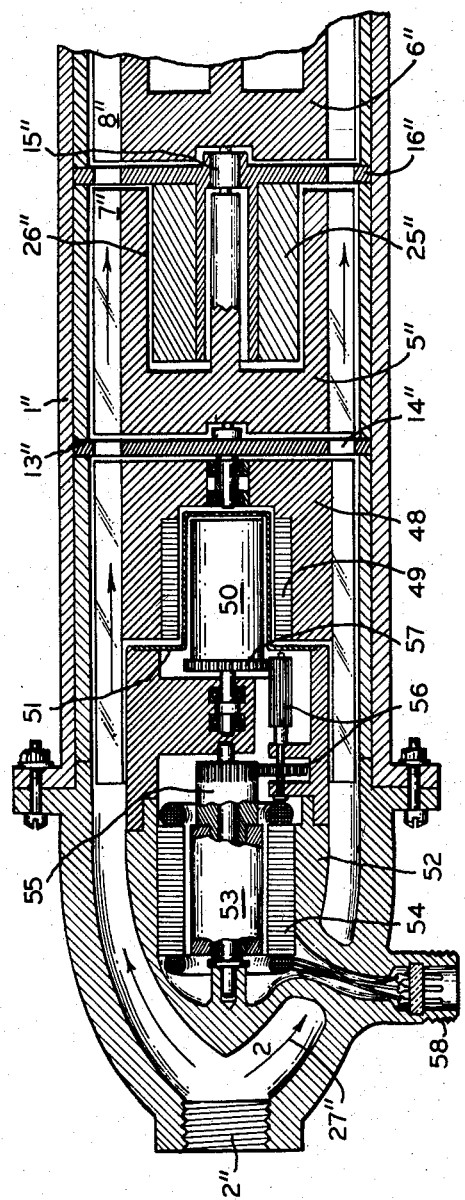

United States Patent Office 2,857,761
Patented Oct. 28, 1958

2,857,761

MASS FLOW METER

Philip K. Bodge, Swampscott, Mass., assignor to General Electric Company, a corporation of New York Application December 20, 1954, Serial No. 476,191

12 Claims. (Cl. 73—194)

The present invention relates to fluid flow measurement and, more particularly, to improved apparatus for accomplishing the measurement of fluid flow in terms of its mass.

Rate of transfer of fluid mass in certain fluid flow circuits is often a characteristic of much greater significance than the simple volumetric flow. By way of illustration, the mass of fuel which is to be used by an aircraft engine bears an important relationship to fuel heat content, expected flight duration, and fuel loading of the craft, while volumetric data concerning the same fuel is of relatively little value because of wide fluctuations of the fuel volume with temperature. Also, in chemical industries, the masses of fluids entering into reactions are generally critical, and distributors of fluids as well as their customers are commonly more concerned with their weight or mass than with volume alone. Among the devices which have long been utilized in the measurement of mass flow, there are, for example, the well known differential-pressure gauges cooperating with Venturi tubes, orifices, Pitot tubes, and nozzles. In addition, weight of fluid flow has been sensed by apparatus which imparts uniform angular velocity of motion to the fluid and involves measurement of either the power expended in accelerating the fluid to that velocity or the momentum lost in a reduction of that angular velocity. The present invention relates to flowmeters which also utilize angular momentum principles, these devices being particularly versatile, rugged, reliable and accurate, in some constructions.

In prior angular momentum flowmeters having impeller and reaction-turbine elements, a constant speed motor has been employed to rotate the fluid impeller at a uniform angular velocity, whereupon the fluid under measurement has a uniform angular velocity of motion imparted to it. The angular momentum of the rotating fluid may then be sensed by a restrained turbine member, the angular deflections of the turbine being related to the mass rate of fluid flow. Unless the impeller speed is maintained uniform with great precision, the turbine deflections will not be properly related to the mass flow and, hence, the measurements will be erroneous. Accordingly, it has been highly desirable to utilize electrical power supplies which have closely controlled output frequencies for the excitation of synchronous constant-speed motors used as the motive means for fluid impellers. It is of obvious advantage to eliminate the need for complicated and costly regulated-frequency power supplies; for example, these units may add weight and space complications in aircraft flowmeter installations. The teachings of the present invention enable an avoidance of these problems, however, it being unnecessary to employ a closely regulated power supply, in one embodiment, and it being possible to dispense with an electrical power supply entirely, when the invention is practiced in another construction.

It is an object to provide novel and improved mass flow measuring apparatus in which constant-speed motive power sources are unnecessary.

An additional object is to provide a mass-measuring flowmeter which is powered by fluids under measurement.

By way of a summary account of one aspect of this invention, I provide a measurement of mass flow in a fluid circuit or path by first imparting a uniform angular momentum to all the fluid under measurement, next rendering the angular velocity of the fluid constant at a predetermined value, and subsequently performing a measurement which is responsive to the angular momentum of the fluid having the constant angular velocity of motion. In one embodiment, the uniform angular momentum is imparted to the fluid by an electric motor driving an impeller through a constant-torque hysteresis drive coupling, the constant angular velocity of motion is realized by passing the fluid through a turbine having an eddy-current restraining mechanism, and the measurement of angular momentum is performed by a resiliently-restrained turbine which deflects angularly in proportion to the mass of flow.

Although the features of this invention which are believed to be novel are set forth in the appended claims, the details of the invention itself and further objects and advantages thereof may be most readily comprehended by reference to the following description taken in connection with the accompanying drawings, wherein:

Figure 1 illustrates, in a longitudinally sectionalized side view, one construction of a self-powered mass flowmeter in conformity with my invention;

Figure 2 is a plot of reaction turbine deflection vs. mass of flow rate for the apparatus of Figure 1;

Figure 3 is a plot of resolver turbine angular velocity vs. mass flow rate for the apparatus of Figure 1;

Figure 4 is a plot of torque exerted on fluid by the torque turbine vs. mass flow rate for the apparatus of Figure 1;

Figure 5 depicts a longitudinal cross-section of an integrating arrangement for mass flow measured by flowmeter apparatus practicing my invention;

Figure 6 is a plot of the angular velocity of the reaction turbine vs. mass flow rate for the apparatus of Figure 5;

Figure 7 is a plot of the angular velocity of a resolver turbine vs. mass flow rate in flowmeter apparatus having the metering arrangement shown in Figure 5;

Figure 8 is a plot of the torque exerted on fluid by the torque turbine vs. mass flow rate in flowmeter apparatus having the metering arrangement shown in Figure 5; and Figure 9 illustrates part of another embodiment of my invention, wherein an electric motor drive is employed.

My apparatus for determining mass of fluid flow in a fluid path may, in one construction, operate by first imparting a uniform momentum to all of the fluid, in a direction which is out of correspondence with the flow direction; second, changing the velocity of the fluid having the uniform momentum to a uniform velocity of motion, also in a direction out of correspondence with the direction of flow; third, reducing this uniform velocity of motion; and, fourth, performing a measurement responsive to the momentum lost by the fluid in the reduction of this uniform velocity of motion. Preferably, the uniform momentum and uniform velocity of motion are angular momentum and angular velocity, respectively.

One flowmeter arrangement for practicing this invention is shown in Figure 1 of the drawing as comprising a generally cylindrical outer structure or casing 1 which is fluid-tight and through which the metered fluid flows from an upstream inlet port 2 to a downstream fluid outlet port 3. Within casing 1 there is contained an upstream torque turbine 4, a resolver turbine 5 in downstream relationship to the torque turbine 4, and a reaction turbine 6 in downstream relationship to the resolver turbine 5. Each of these turbines is substantially cylindrical in outer configuration, and they are proximately positioned in an end-to-end array such that their longitudinal axes lie along the longitudinal axis of the surrounding structure 1. Resolver turbine 5 and reaction turbine 6 fit closely within the inner cylindrical surfaces of casing 1, and both have a number of equally spaced open-ended longitudinal slots separated by partitions 7 and 8, respectively, which are disposed near the peripheries of these turbines at a fixed radial distance from their longitudinal axes. The torque turbine 4, which also serves as a fluid-impeller in a manner described hereinafter, is provided with peripheral skewed slots formed by helical or skewed partitions 9.

A streamlined upstream bracket 10 provides one bearing support 11 for the rotation of torque turbine 4 about its longitudinal axis, another bearing support 12 being afforded by the viscous decoupling plate 13 which has fluid passages 14 therethrough. Bearing 12 also mounts resolver turbine 5 for rotation about the same axis, in cooperation with bearing 15 in the second and similarly designed viscous decoupling plate 16. Reaction turbine 6 is angularly movable about the same axis, its support being provided by bearing 15 and by bearing 17 in the downstream streamlined bracket 18. A restraining spring 19 is illustrated as coupled between reaction turbine 6 and the casing 1, for the purpose of restraining angular movement of turbine 6 in its bearings, and an electrical pick-off rotor 20 moves with turbine 6 relative to its bracket-mounted stator core and coil 21 to occasion electrical output signals across leads 22 which characterize the angular relationships between turbine 6 and casing 1. The electrical pick-off may conveniently comprise a permanently-magnetized rotor cooperating with a polyphase-tapped stator coil wound toroidally about a saturable annular core, the unit operating upon second-harmonic principles in a well known manner and being coupled with a similar remote unit serving as a repeater. Alternatively, any suitable signal generator may be employed to produce a control signal or to serve as a telemetering transmitter, and a direct-reading pointer or other indicator may be coupled with turbine 6 where direct indications are desired.

As has been noted above, the reaction turbine 6 is restrained by a spring, in the embodiment of Figure 1. The torque turbine 4, however, is angularly restrained by a constant-torque mechanism including a permanent magnet stator 23, fixedly mounted with respect to the casing 1 on decoupling plate 13, and a rotor 24 of hysteresis material fixed with torque turbine 4 in a proximity to stator 23 which permits interaction with the magnetic field thereof. Rotor element 24 may be formed of laminations of material such as chrome steel, Cunico, or Alnico V, which exhibit a desired large hysteresis loop characteristic. Stator 23 and hysteresis rotor 24 develop a torque which is substantially uniform and independent of their relative angular speeds over a certain range of speeds. The hysteresis rotor 24 turns with the torque turbine 4, of course, the rotation of the torque turbine being occasioned by fluid impinging upon the skewed peripheral partitions 9. Resolver turbine 5 is also restrained in its angular movement, by an eddy-current drag arrangement comprising a permanent magnet stator 25 fixed with casing 1, by way of decoupling plate 16, and a cooperating conductive eddy-current member 26 on turbine 5. This drag mechanism serves to preserve a constant angular velocity of motion of resolver turbine 5 responsive to fluid flows of a wide range.

The courses of fluid flow through the flowmeter of Figure 1 are represented by arrows such as those identified by the reference character 27. Upon admission to casing 1 through upstream port 2, the fluid is channeled into the peripheral skewed slots of torque turbine 4 by the upstream bracket 10. In impinging upon the helical partitions 9, the fluid imparts a rotation to the torque turbine, and the latter opposes such rotation with a torque essentially uniform in value for flow rates above a predetermined minimum. That torque is reflected upon the fluid passing through the torque turbine as a reaction torque, whereupon all the fluid leaving that turbine has substantially a predetermined angular momentum, except when the flow rate drops to very low values. If the turbine 4 were freely rotatable, the emitted fluid would have no angular momentum, of course, and, if this turbine were fixed in angular position, the emitted fluid would have angular momentums varying with the flow rate; but, the constant-torque characteristic of the hysteresis stator and rotor combination uniquely accomplishes the conversion of the flow into one wherein there is a uniform angular momentum. Stationary viscous decoupling plate 13 insures that movements of turbine 4 and turbine 5 will not be communicated therebetween through viscous couplings. Because angular momentum of the fluid is the product of its moment of inertia and its angular velocity, it is evident that fluids having a uniform angular momentum upon being discharged from torque turbine 4 may yet have varying angular velocities and moments of inertia. Resolver turbine 5 receives the fluid from the torque turbine 4, and discharges it downstream from its longitudinal peripheral slots with a uniform angular velocity, such that the fluid then has an angular momentum which varies with the mass rate of fluid flow. Spring-restrained reaction turbine 6 admits the fluid with this variable angular momentum into its longitudinal peripheral slots, where its angular velocity is reduced to zero and its angular momentum is wholly lost to turbine 6. Angular deflection of reaction turbine 6 is thus indicative of the mass rate of flow. Stationary decoupling plate 16 prevents viscous drag from affecting reaction turbine displacements.

The embodiment in Figure 1 is partially self-compensating for the influences of temperature variations, in that the fields of permanent magnet stators 23 and 25 vary in the same way with temperature. As the field of stator 23 is reduced, thereby lessening the torque on turbine 4, the field of stator 25 is likewise reduced, such that the turbine 5 will turn faster, whereupon the two effects tend to cancel. Further temperature compensation, principally for changes in resistance of the eddy-current conducting material, may be effected through use of magnet shunts, bimetallic spacing members, or other known expedients.

The plot in Figure 2 depicts the changes in torque exerted by reaction turbine restraining spring 19 with changed mass flow rates. Point 28 represents the condition under which the torque turbine 4 begins to exert a substantially constant torque, and, from that point to point 29 on the curve, the resolver turbine 5 rotates at a substantially constant angular velocity. The torque exerted by the restrained reaction or measuring turbine 6 is thus linearly variable with mass rate of fluid flow between these points. Beyond point 29, mass flow rate continues to be measured in terms of torque exerted by spring 19, although the function is longer linear. Insofar as the non-linearity may provide for different scale graduations at high mass flow rates, this may be advantageous for some applications.

In Figure 3, the angular velocity of resolver turbine 5 is plotted against mass flow rate, and it is perceived that this velocity is substantially uniform over a range between points 30 and 31, corresponding to the range between points 28 and 29 in Figure 2. The torque exerted on the fluid flow stream by torque turbine 4 is plotted against mass flow rate in Figure 4, wherein it is clear that this torque is substantially the same for the flow range between points 32 and 33, corresponding to the same flow ranges identified on the other curves.

For the measurement of total or integrated mass flow through a flowmeter as taught by this invention, an arrangement such as that illustrated in Figure 5 may be utilized. Only the downstream end of a flowmeter is depicted there, and, for convenience, the parts in common with the embodiment in Figure 1 are designated by the same reference characters bearing prime accents. Upstream in relationship to reaction turbine 6', there may be located the same elements as described in connection with Figure 1, or as shown and described later herein with reference to Figure 9. Turbine 6' is restrained by an eddy-current damping arrangement including a permanent magnet stator 34, fixed in relation to casing 1' by way of mounting plate 35, in magnetic influencing relationship to the inner conducting surfaces 36 of the turbine 6', which may be of conducting material such as aluminum. The measuring or reaction turbine 6' is damped heavily, by this eddy-current arrangement, such that its angular velocity is small as compared with the angular velocity of the upstream resolver turbine. A substantially fixed percentage of the angular momentum is removed from the fluid stream by turbine 6', and thus its total number of revolutions is directly proportional to the total mass flow. These revolutions are totalized by a conventional counter 37 which is driven by the reaction turbine shaft 38 through a magnetic coupling comprised of members 39 and 40 magnetically interacting with one another through a thin nonmagnetic wall 41 sealed with the outer casing.

Figure 6 portrays the resulting substantially linear relationship of angular velocity of turbine 6' in Figure 5 vs. mass flow rate over the preferred flow range between points 42 and 43. Resolver turbine angular velocity and torque exerted by a torque turbine are plotted against mass flow rate in Figures 7 and 8, respectively, for a flowmeter of the type represented in Figure 5, and the flow characteristics between range points 44 and 45 and between 46 and 47 on these plots are like those presented in the plots of Figures 3 and 4, respectively.

A further preferred embodiment of my concepts is portrayed in the longitudinal cross-section of the upstream port of a flowmeter in Figure 9. This apparatus is distinguished in constructional detail from the embodiment in Figure 1 principally in connection with its constant-torque elements, and, in the interest of a simplified description, those parts which correspond to parts of the flowmeter in Figure 1 are identified by the same reference characters modified with double prime accents. The means for imparting uniform angular momentum to the fluid flow includes the longitudinally and peripherally bladed cylindrical impeller member 48 which is mounted on decoupling plate 13" for rotation about the longitudinal axis of casing 1". Hysteresis laminations 49 are carried by impeller 48 and are disposed proximately with the permanent magnet rotor 50, these elements 49 and 50 comprising a constant-torque coupling. Preferably, a thin sealing member 51 is interposed between the impeller laminations 49 and rotor 50, such that fluids under measurement will not be admitted to the upstream bracket 52 with which the member 51 is sealed and within which rotor 50 is disposed.

Driving power for the rotation of permanent magnet rotor 50 is derived from an electric motor including a rotor 53 and a stator core and coil assembly 54, these being housed within sealed bracket 52. Power flow from rotor 53 is traced from the rotor gear 55, through intermediate gears 56, and to gear 57 fixed with the permanent magnet rotor 50, and this train provides a desired speed reduction. Electrical excitation brought through connector 58 to motor stator 54 need not be regulated precisely to preserve a critical synchronous motor speed, inasmuch as a uniform angular momentum will always be imparted to fluid passing through impeller 48 and normally expected speed variations of the motor rotor 55 will not alter the constant-torque characteristics of the hysteresis coupling. Fluid leaving impeller 48 with a uniform angular momentum will be caused to assume a uniform angular velocity, by resolver turbine 5", and the reaction turbine 6" may either deflect against a restraining spring in the manner of turbine 6 in Figure 1 or move angularly against damping restraint in the manner of turbine 6' in Figure 5.

Accordingly, while particular embodiments of this invention have been shown and described herein, it will occur to those skilled in the art that various changes, modifications and substitutions may be effected without departing either in spirit or scope from the invention as set forth in the appended claims.

What I claim as new and desire to secure by Letters Patent of the United States is:

1. Fluid mass flowmeter apparatus for coupling into a fluid flow path comprising means imparting a substantially uniform angular momentum to all the flowing fluid, means regulating the angular velocity of said fluid having said uniform angular momentum to establish a uniform angular velocity of motion of said fluid, angularly movable means reducing said uniform angular velocity of motion, and measuring means responsive to angular movement of said movable means in said reduction of said uniform angular velocity of motion.

2. Fluid mass flowmeter apparatus comprising means driving all the fluid with a constant-torque to impart a substantially uniform momentum to all of said fluid out of correspondence with the direction of the flow velocity of said fluid, means opposing flow of said fluid having said uniform momentum with force proportional to velocity of said fluid, whereby to regulate the velocity of said fluid to a substantially uniform velocity of motion out of correspondence with said flow velocity direction, movable means positioned to reduce said uniform velocity of motion, and means measuring the movements of said velocity-reducing means.

3. Fluid mass flowmeter apparatus comprising a first rotatable member for accelerating all the fluid angularly, means exerting substantially constant torques on said rotatable member, whereby a substantially uniform angular momentum is imparted to all of said fluid by said member, a second rotatable member positioned to interact with said fluid having said uniform angular momentum, means restraining rotation of said second member with force proportional to angular velocity of said second member, whereby said second member regulates the angular velocity of said fluid at a substantially uniform value, third angularly movable means positioned to reduce said uniform angular velocity of said fluid, means restraining angular movement of said third member, and means measuring angular movements of said third member.

4. Fluid mass flowmeter apparatus comprising a first rotatable member for accelerating all the fluid angularly responsive to flow motion of said fluid, constant torque means angularly restraining rotation of said member with a substantially uniform torque, whereby a substantially uniform angular momentum is imparted to all of said fluid by said member, a second rotatable member interacting with said fluid having said uniform angular momentum, means restraining rotation of said second member with force proportional to angular velocity of said second member, whereby said second member interacts with said fluid to produce a substantially uniform angular velocity of motion of said fluid, third angularly movable means positioned to reduce said uniform angular velocity of said fluid, means restraining angular movement of said third member, and means measuring angular movements of said third member.

5. Fluid mass flowmeter apparatus comprising a first rotatable member for accelerating all the fluid angularly, electric motor means for rotating said member, constant torque means angularly coupling said motor means in driving relationship to said member such that a substantially uniform driving torque is applied to said member, whereby a substantially uniform angular momentum is imparted to all the fluid by said member, a second rotatable member interacting with said fluid having said uniform angular momentum, means restraining rotation of said second member with force proportional to angular velocity of said second member, whereby said second member interacts with said fluid to produce a substantially uniform angular velocity of motion of said fluid, third angularly movable means positioned to reduce said uniform angular velocity of said fluid, means restraining angular movement of said third member, and means measuring angular movements of said third member.

6. Fluid mass flowmeter apparatus comprising a fluid-tight casing having means for coupling said casing into a fluid flow path, a first rotatable member mounted within said casing and having fluid flow passages therethrough disposed such that rotation of said member angularly accelerates all of the fluid passing through said casing, means for rotating said member, means angularly restraining rotation of said first member in relation to said casing with a substantially uniform torque, whereby a substantially uniform angular momentum is imparted to all of said fluid by said member, a second rotatable member within said casing in a downstream relationship to said first member and having fluid flow passages therethrough disposed such that said second member interacts with all of the fluid passing through said casing, means restraining rotation of said second member in relation to said casing with force proportional to angular velocity of said second member, whereby said second member interacts with said fluid to produce a substantially uniform angular velocity of motion of said fluid, a third angularly movable member within said casing in a downstream relationship to said second member and having fluid passages therethrough disposed such that said third member interacts with all of the fluid passing through said casing, means restraining angular movement of said third member in relation to said casing, whereby said third member reduces said uniform angular velocity of said fluid, and means measuring angular movements of said third member in relation to said casing.

7. Fluid mass flowmeter apparatus as set forth in claim 6 wherein said means angularly restraining rotation of said first member comprises a magnet member and a member of hysteresis material disposed for magnetic interaction with the magnetic field of said magnet member, one of said magnet and hysteresis members being angularly fixed with said first rotatable member and the other being supported by said casing for relative angular movement in relation to said one of said members.

8. Fluid mass flowmeter apparatus as set forth in claim 6 wherein said means for rotating said first member comprises an electric motor, and wherein said means angularly restraining rotation of said first member comprises a magnet member, and a member of hysteresis material disposed for magnetic interaction with the magnetic field of said magnet member, one of said magnet and hysteresis members being angularly fixed with said first rotatable member and the other being mounted for rotation by said motor.

9. Fluid mass flowmeter apparatus as set forth in claim 6 wherein said means restraining rotation of said second member comprises a magnet member, and an eddy-current conducting member disposed for magnetic interaction with the magnetic field of said magnet member, one of said conducting and magnet members being angularly fixed with said second rotatable member and the other being angularly fixed in relation to said casing.

10. Fluid mass flowmeter apparatus comprising a fluid-tight casing having a substantially cylindrical fluid chamber therein, said chamber having fluid couplings at each end for coupling said casing into a fluid flow path, a first substantially cylindrical rotatable member having a plurality of fluid passages therethrough near the periphery thereof and mounted within said chamber for rotation about the longitudinal axis thereof, said fluid passages being curved such that fluid flow therethrough imparts rotation to said rotatable member, a permanent magnet member, a member of hysteresis material disposed for interaction with the magnetic field of said magnet member, one of said hysteresis and magnet members being angularly fixed with said rotatable member and the other being angularly fixed with said casing, whereby substantially uniform angular momentum is imparted to all of the fluid passing through said rotatable member, a second substantially cylindrical rotatable member having a plurality of longitudinal fluid passages therethrough near the periphery thereof and mounted for rotation within said chamber about said longitudinal axis in a proximate downstream relation to said first member, a second permanent magnet member, an eddy-current conducting member disposed for interaction with the magnetic field of said second magnetic member, one of said conducting and second magnet members being angularly fixed with said second rotatable member and the other being angularly fixed with said casing whereby said fluid passing through said second rotatable member has a substantially uniform angular velocity of motion, a third substantially cylindrical rotatable member having a plurality of longitudinal fluid passages therethrough near the periphery thereof and mounted for rotation within said chamber about said longitudinal axis in a proximate downstream relationship to said second rotatable member, means restraining angular movement of said third member in relation to said casing, and means measuring angular movements of said third member in relation to said casing.

11. Fluid mass flowmeter apparatus comprising a fluid-tight casing having a substantially cylindrical fluid chamber therein, said chamber having fluid couplings at each end for coupling said casing into a fluid flow path, a first substantially cylindrical rotatable member having a plurality of fluid passages therethrough near the periphery thereof and mounted within said chamber for rotation about the longitudinal axis thereof, electric motor means positioned within said casing, a permanent magnet member, a member of hysteresis material disposed for interaction with the magnetic field of said magnet member, one of said hysteresis and magnet members being angularly fixed with said rotatable member and the other being mounted within said chamber for rotation by said motor means, whereby substantially uniform angular momentum is imparted to all of the fluid passing through said rotatable member, a second substantially cylindrical rotatable member having a plurality of longitudinal fluid passages therethrough near the periphery thereof and mounted for rotation within said chamber about said longitudinal axis in a proximate downstream relation to said first member, a second permanent magnet member, an eddy-current conducting member disposed for interaction with the magnetic field of said second magnetic member, one of said conducting and second magnet members being angularly fixed with said second rotatable member and the other being angularly fixed with said casing whereby said fluid passing through said second rotatable member has a substantially uniform angular velocity of motion, a third substantially cylindrical rotatable member having a plurality of longitudinal fluid passages therethrough near the periphery thereof and mounted for rotation within said chamber about said longitudinal axis in a proximate downstream relationship to said second rotatable member, means restraining angular movement of said third member in relation to said casing, and means measuring angular movements of said third member in relation to said casing.

12. Fluid mass flowmeter apparatus as set forth in claim 11 wherein said means restraining angular movement of said third member comprises an angularly resilient spring member coupled between said third member and said casing, and wherein said measuring means is calibrated to indicate mass rate of fluid flow.

References Cited in the file of this patent

UNITED STATES PATENTS

| | | |
|---|---|---|
| 720,188 | Seidener | Feb. 10, 1903 |
| 1,401,299 | Wohlenberg | Dec. 27, 1921 |
| 2,602,330 | Kollsman | July 8, 1952 |
| 2,714,310 | Jennings | Aug. 2, 1955 |

OTHER REFERENCES

A publication entitled, "A Fast-Response True-Mass-Rate Flowmeter" by Yao Tzu Li and Shih-Ying Lee published in ASME Transactions, July 1953.